United States Patent [19]

Tanuma et al.

[11] Patent Number: 5,200,763
[45] Date of Patent: Apr. 6, 1993

[54] PRINTER WITH AN LED PRINT HEAD HAVING MEANS FOR SETTING DATA ABOUT THE PRINT HEAD

[75] Inventors: Jiro Tanuma; Naoji Akutsu, both of Tokyo, Japan

[73] Assignee: Oki Electric Co., Ltd., Tokyo, Japan

[21] Appl. No.: 668,492

[22] PCT Filed: Sep. 14, 1989

[86] PCT No.: PCT/JP89/00940
§ 371 Date: Mar. 20, 1991
§ 102(e) Date: Mar. 20, 1991

[87] PCT Pub. No.: WO90/03273
PCT Pub. Date: Apr. 5, 1990

[30] Foreign Application Priority Data

Sep. 21, 1988 [JP] Japan ............ 63-236799

[51] Int. Cl.⁵ ............ G01D 9/42; G01D 15/14
[52] U.S. Cl. ............ 346/107 R; 346/154
[58] Field of Search ............ 346/107 R, 154, 160, 346/76 PH; 358/300, 302; 400/175

[56] References Cited

U.S. PATENT DOCUMENTS 4,588,883 5/1986 Abbas .
4,746,941 5/1988 Pham et al. ............ 346/154 X
4,831,395 5/1989 Pham et al. ............ 346/154 X

FOREIGN PATENT DOCUMENTS 0042206 12/1981 European Pat. Off. .
0260574 3/1988 European Pat. Off. .
0274435 7/1988 European Pat. Off. ............ 400/175
56-168292 12/1981 Japan .
0209578 12/1983 Japan ............ 346/76 PH
62-275759 11/1987 Japan .
63-10293 3/1988 Japan .
63-71373 3/1988 Japan .
2193162 2/1988 United Kingdom .

OTHER PUBLICATIONS

Lomis, Robert A. "Storage of Operating Parameters in Memory Integral with Printhead". Xerox Disclosure Journal, vol. 8, No. 6, Nov./Dec. 1983 p. 503.
Patent Abstracts of Japan (Japanese 62-275,759) 44 M 696.
Patent Abstracts of Japan, vol. 10, No. 155 (M-485) [2211], (Jun. 4, 1986) (Japanese 61-10,475).

Primary Examiner—Benjamin R. Fuller
Assistant Examiner—David Yockey
Attorney, Agent, or Firm—Spencer, Frank & Schneider

[57] ABSTRACT

An LED array printer includes an LED array print head (1) and a control circuit board (31) for controlling the LED array printer. A setting arrangement circuit (41) for setting the characteristics and specifications of the head is disposed in the head (1). setting data is read from the setting arrangement (41) and transferred to the control circuit board (31) in order to control the head (1).

5 Claims, 7 Drawing Sheets

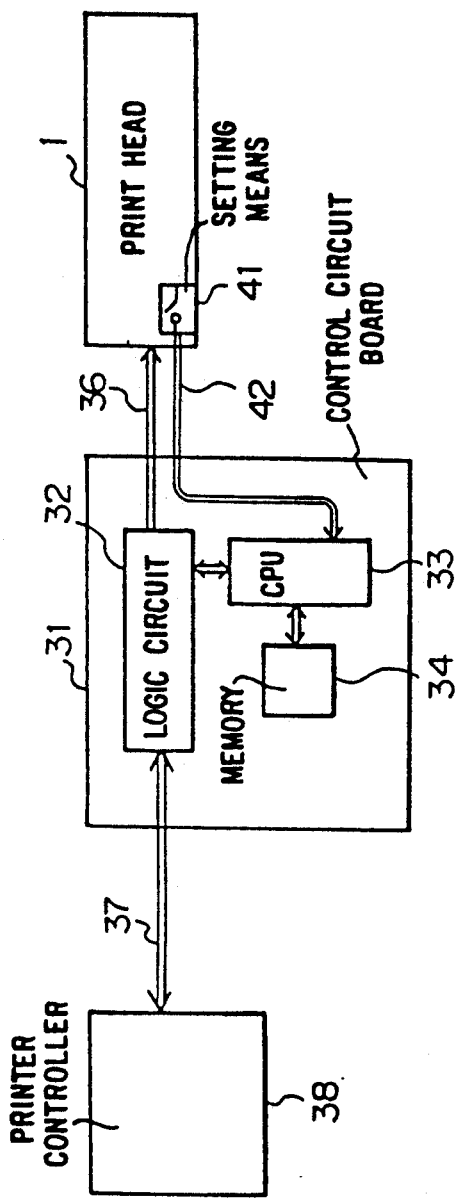
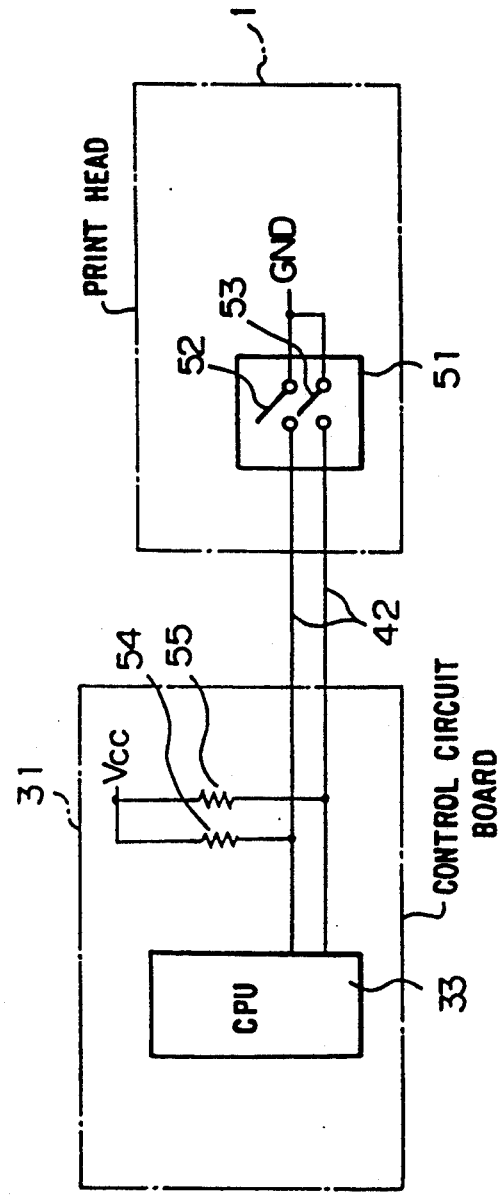
Fig. 1
Fig. 2

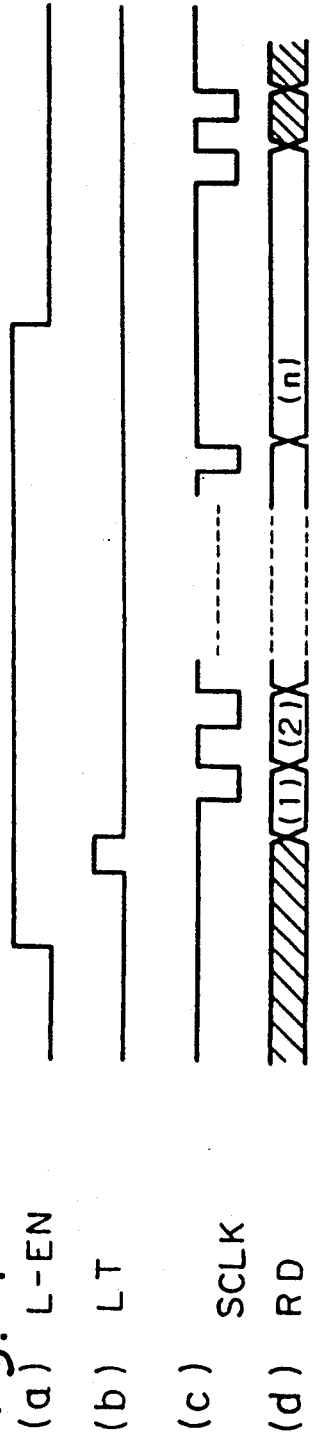
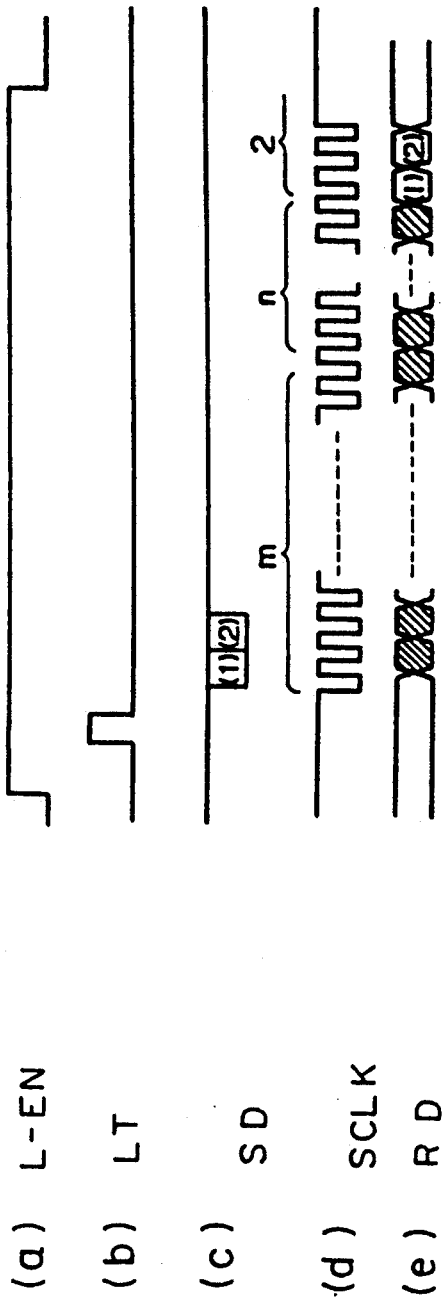
Fig. 7
(a) L-EN
(b) LT
(c) SCLK
(d) RD
Fig. 9
(a) L-EN
(b) LT
(c) SD
(d) SCLK
(e) RD

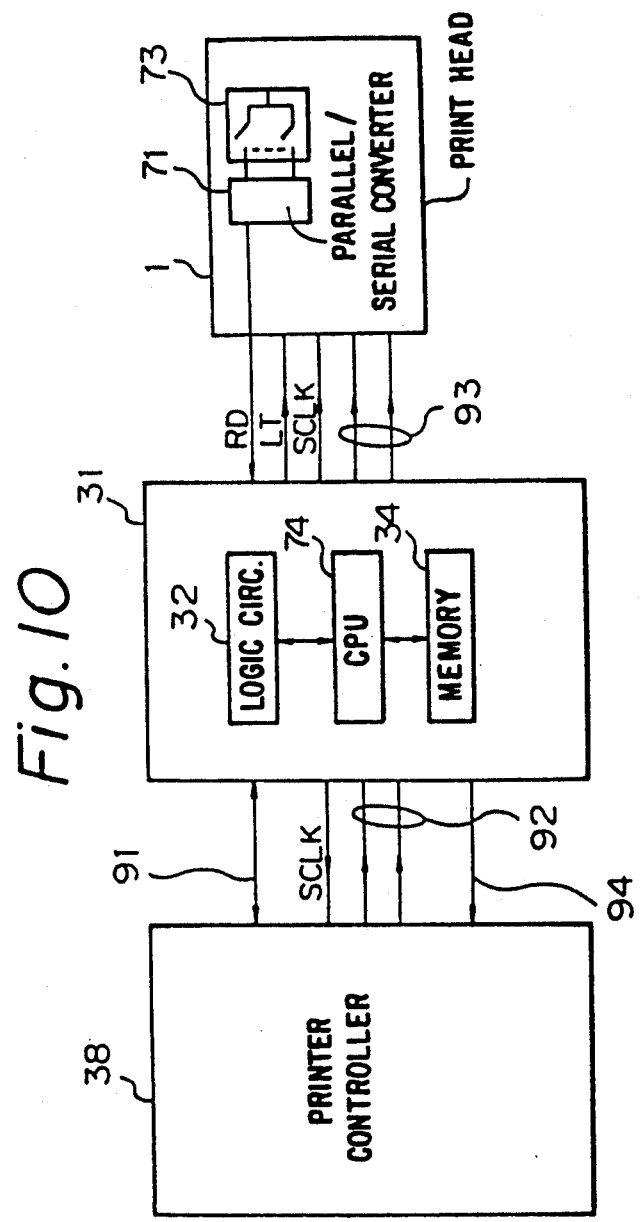

PRINTER WITH AN LED PRINT HEAD HAVING MEANS FOR SETTING DATA ABOUT THE PRINT HEAD

FIELD OF THE INVENTION

The present invention relates to an LED array printer which prints given characters and graphics on paper or the like with the use of, for example, electrophotographic technology.

BACKGROUND ART

In an LED array printer, light emitted from an LED array print head is transmitted through a rod lens array onto a photosensitive drum so as to obtain an electrostatic latent image. The electrostatic latent image is then developed into a toner image by a developing unit and transferred onto paper by a transfer unit.

To form the electrostatic latent image, the photosensitive drum is charged to a predetermined potential by a charger, and irradiated with light corresponding to predetermined data.

The LED array print head includes a plurality of LED array chips and an LED driver for driving the array chips. The chips are mounted on a substrate and driven by signals transmitted between the LED array print head and a control circuit.

The control circuit for controlling the LED array print head is connected to the LED array print head through connectors and a connecting cable. The control circuit includes a logic circuit for controlling the timing of data provided to the LED print head, a CPU, memory storing therein a control program for printing, data, and the like, and a switch array for setting several kinds of modes.

The switch array is used to set parameter information relating to the specifications of the LED array print head, variations in characteristics, and the like. The CPU detects whether switches of the switch array are turned on or off and produces the parameter information, corresponding to the setting of the switches, so as to control the logic circuit.

LED array chips having a large number of divisions are used in order to increase the dot resolution so as to enhance the quality of printing. Furthermore, the number of array chips has to be increased in order to enable printing on a large size paper. However, this causes higher cost, and the power consumption increases. Accordingly, it would be desirable in general for such an LED printer to be designed to have specifications which cope with specific needs or demands.

However, should printers be specifically manufactured based on several different specifications, the manufacturing cost would soar while the time for research and development would become longer. To avoid such higher manufacturing cost and longer R&D time, a basic structure is shared with different kinds of printers, and only component parts which cannot be common are specifically designed. For example, by choosing LED array print heads and selecting several parameters for printing control, the same basic printers can have several different functions. Further, if there are variations in characteristics such as light emission or the like among the LED array print heads, uniform printing quality cannot be obtained even though LED array print heads having the same specifications are connected respectively to the control circuits, and accordingly, compensation for the variations in the characteristics must be provided while printing.

In conventional LED array printers, various functions and specifications have been obtained in the same kind of printers with the use of a switch array disposed in the control circuit, and further, variations in the characteristics of the LED array print head, have to be absorbed while printing However, although the specifications and characteristics of an LED array print head should be known in order to manipulate the switch array, there has been no indication showing such information on the LED array print head. Further, if an LED array print head is to be replaced due to a desired change in the specifications due to a failure thereof, the switches should be reset in accordance with the specifications and characteristics of the new connected LED array print head.

Accordingly, in a conventional LED array printer, it is troublesome to set parameter data relating to the specifications and characteristics of an LED array print head in the printer control circuit, and there is also the possibility of an erroneous setting. forgetting to set or the like. Should parameter data in the control circuit be inappropriate for the connected LED array print head, the printing quality would become worse and the printer might not ever work. Further, there is the possibility of damaging the LED array print head.

SUMMARY OF THE INVENTION

The present invention is devised in view of the above-mentioned problems so as to provide an LED array printer in which parameter data relating to the specifications and characteristics of an LED array print head can be set easily, surely and precisely.

The present invention provides an LED array printer comprising an LED array print head in which a plurality of LED array chips are arranged, and a control circuit for controlling the LED array print head, wherein a setting means for setting data indicating the specifications and characteristics of the LED array print head is provided in the LED array print head, and a data reading means for reading data from the setting means to control the LED array print head is provided in the control circuit.

The above-mentioned setting means comprises a switch array, bonding wires, short wires or the like, and is disposed in the LED print head itself. Accordingly, it is possible to set printing control data corresponding to the characteristics and the specification of the LED array print head in the combination between the control circuit and the LED array print head without fail, thereby it is possible to eliminate inaccurate printing, inferior printing quality, failure of the print head, and the like.

Further, by serially reading setting data from the setting means, the number of lines required for reading can be reduced. It is also possible to facilitate the production of printers having different specifications.

BRIEF DESCRIPTION OF THE DRAWINGS

FIG. 1 is a block diagram showing the general principle of an LED array printer according to present invention;

FIG. 2 is a block diagram showing a first specific embodiment of the present invention;

FIG. 7 is a timing chart for FIG. 6;

FIG. 9 is a timing chart for FIG. 8.

FIG. 10 is a block diagram showing a fifth specific embodiment of the invention.

DESCRIPTION OF THE PREFERRED EMBODIMENTS OF THE INVENTION

Figure 3:
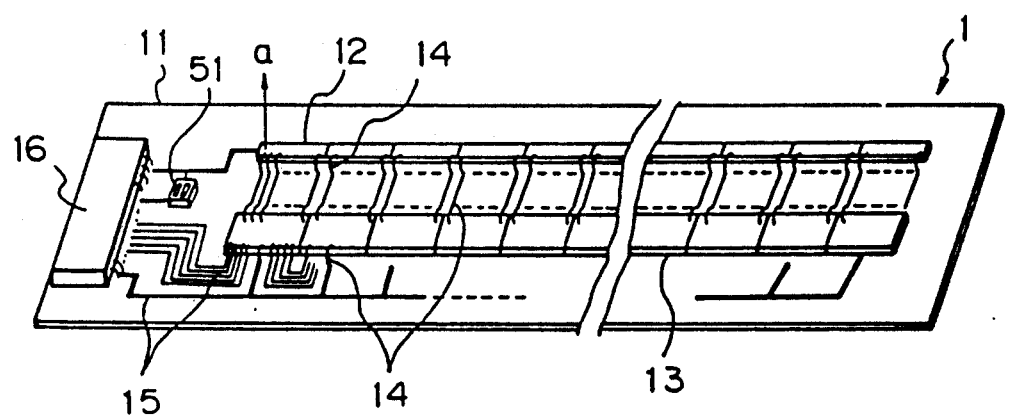
FIG. 3 is a perspective view illustrating an LED array print head used in the first specific embodiment of the present invention.

FIG. 1 is a block diagram showing the control principles for a generalized embodiment of an LED array print head 1 according to the present invention. A control circuit board 31 has a logic circuit 32 for controlling the timing of data fed to an LED array print head 1, a CPU 33 for controlling the transmission of data and commands between itself and a host printer controller 38, controlling the transmission of data and signals between itself and the LED array print head 1, and controlling the operation of printing, and a memory 34 for storing a control program for the CPU 33, data, and the like. Reference numeral 36 denotes a bus through which signals are provided to the LED array print head, including signal lines SD, SCLK, LT, STB, a power line from a power source Vcc, a ground wire, and the like. Reference numeral 37 is a bus for printing data, and feeds data that is processed and edited by the printer controller 38 to the logic circuit 32. According to the present invention, a setting means 41 for setting the characteristics and the specifications of the LED array print head 1 is disposed in the LED array print head 1. Further, the setting means 41 is connected to the CPU 33 through a bus 42.

When the power source is turned on, the CPU 33 first reads the setting data provided by the setting means 41 using a program which has been previously stored in the memory 34. Then, the CPU 33 reads corresponding parameters from the memory 34 in accordance with the read setting data or computes them, and sets them as print control information. Further, it drives and controls the LED array print head 1 through the intermediary of the logic circuit 32.

The setting in the setting means 41 concerns the characteristics, the specifications and the like of the LED print head 1 to be mounted, and is made at the time of manufacture of the LED print head 1. Accordingly, there is no risk of erroneously setting the printing control information.

FIG. 2 shows a first specific embodiment of the present invention. In this figure, a switch array 51 having two switches 52, 53 is used as the setting means 41. One terminal of the switches 52, 53 is grounded, and the other terminal is connected through the bus 42 to the CPU 33 and to the power source (having a predetermined voltage Vcc) through pull-up resistors 54, 55. A table, such as Table 1 below, has previously been stored in the memory 34 on the control board 31.

TABLE 1

| SWITCH NO. | KINDS OF LED ARRAY PRINT HEADS | | | |
|---|---|---|---|---|
| | A | B | C | D |
| 52 | TURN ON | TURN OFF | TURN ON | TURN OFF |

TABLE 1-continued

| SWITCH NO. | KINDS OF LED ARRAY PRINT HEADS | | | |
|---|---|---|---|---|
| | A | B | C | D |
| 53 | TURN ON | TURN ON | TURN OFF | TURN OFF |
| STROBE TIME (μs) | 55 | 60 | 65 | 70 |

Depending on whether switches 52 and 53 are turned ON or OFF, either one of four modes can be set. Accordingly, when an LED array print head 1 which is set in a predetermined mode is installed, the strobe time in the mode is read from the memory 34, and is set automatically.

FIG. 3 shows the arrangement of the above-mentioned LED array print head 1. Reference numeral 11 denotes a circuit board on which a plurality of LED array chips 12 are linearly arrayed. The above-mentioned chips 12 emit light in the direction of the arrow a in the figure. Reference numeral 13 denotes an LED driver 13 composed of a serial/parallel converting circuit for data, a register for holding data which has been subjected to parallel conversion, a print timing data circuit, and drive transistors which deliver light emission drive current to the LEDs. The LED array chips 12 and the LED drivers 13 are connected together by bonding wires 14. Reference numeral 15 denotes a printed circuit pattern for feeding power and signals, and reference numeral 16 denotes a connector which is connected to the printer controller 38. The switch array 51 of the LED array print head 1 is disposed in the vicinity of the connector 16, and the switches are set during manufacture. Accordingly, when the LED print head 1 is connected to the control circuit board 31, data indicating the specifications and the characteristics of this print head has already set, and parameter information can be obtained by simply connecting the control circuit board 31 to the LED print head 1.

Figure 4:
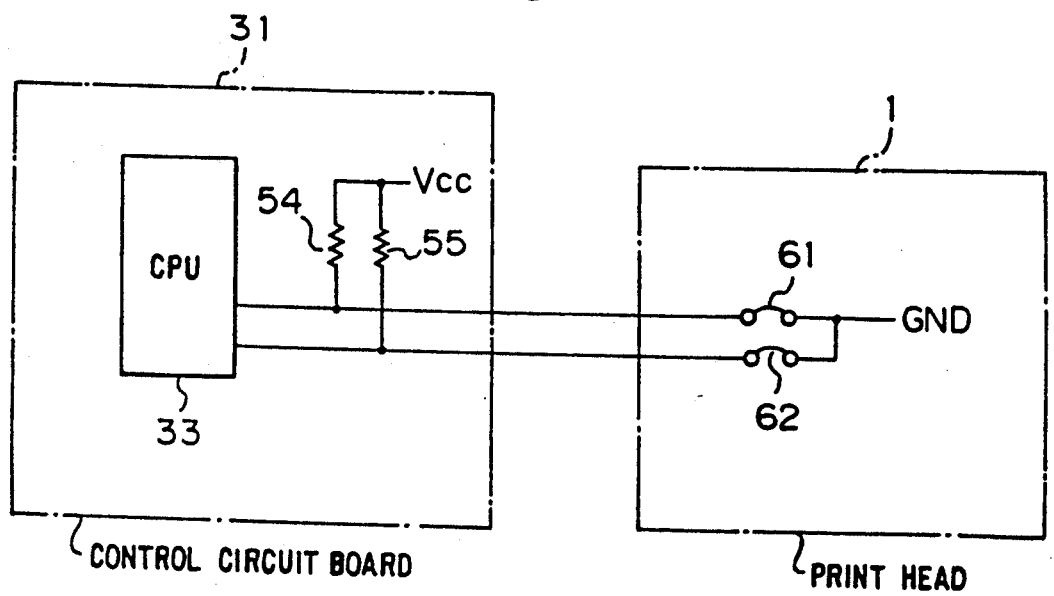
FIG. 4 is a block diagram illustrating a second specific embodiment of the present invention.
Figure 5:
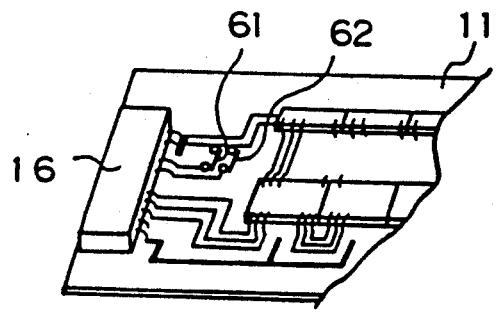
FIG. 5 is a perspective view illustrating part of an LED array print head used in the second specific embodiment of the present invention.

FIG. 4 shows a second specific embodiment of the present invention. In this embodiment, the setting means 41 is composed of short wires 61, 62. Since the setting in the setting means 41 is made for the LED array print head 1 on which the short wires are mounted, the setting means need not be variable. Accordingly, it is possible to fix the setting by means of the short wires 61, 62. Accordingly, upon manufacture of the LED array print head 1, the short wires 61, 62 can be soldered together with the connector 16 and the like as shown in FIG. 5. It is possible to use bonding wires, instead of the short wires.

Thus, with the use of short wires or bonding wires instead of the switch array, it is possible to reduce the mount space and the cost. Further, there is substantially no risk of an erroneous setting, so it is possible to enhance reliability.

Figure 6:
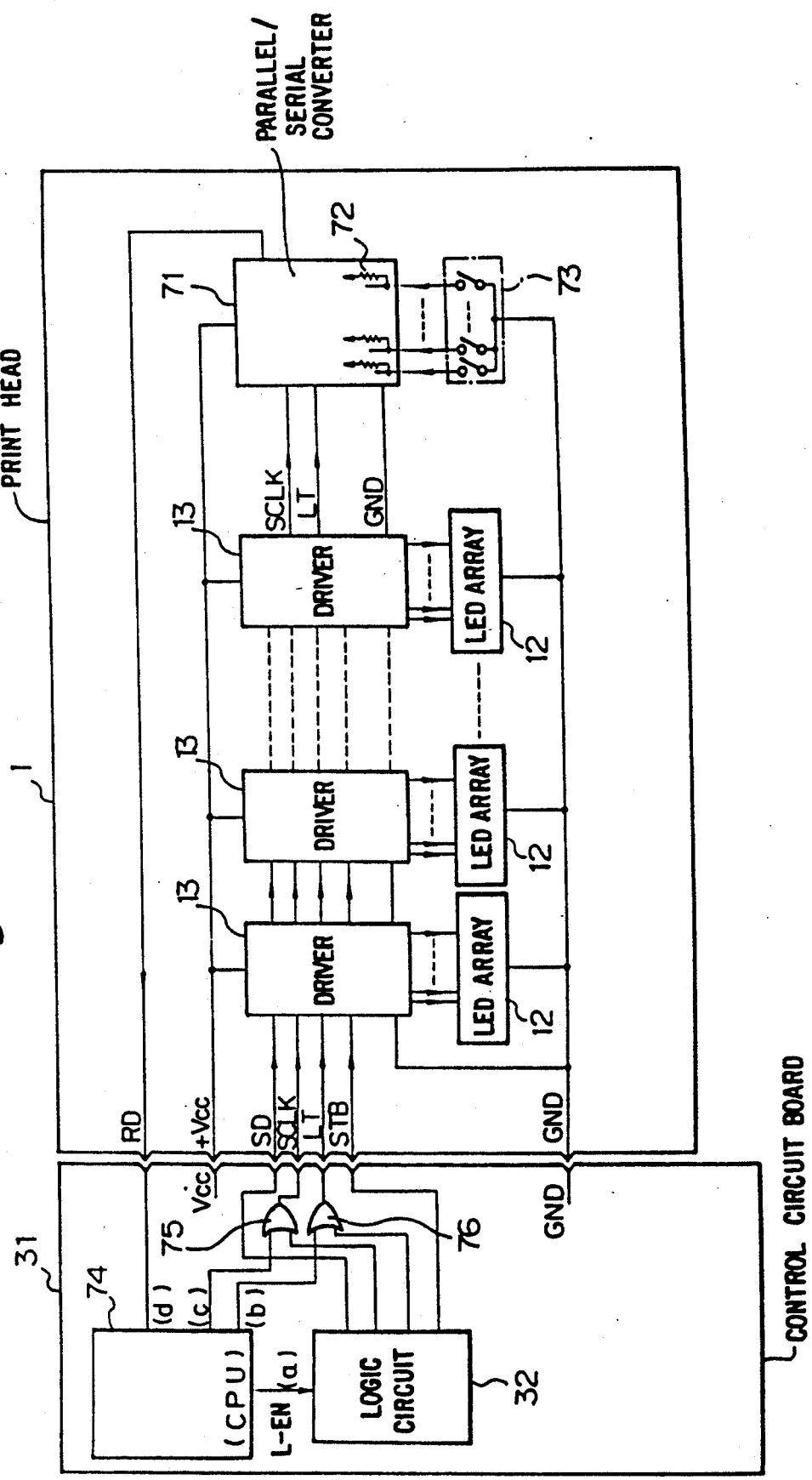
FIG. 6 is a block diagram showing a third specific embodiment of the present invention.

FIG. 6 shows a third specific embodiment of the present invention. The LED array print head 1 is provided with a parallel/serial converter IC 71 which incorporates pull-up resistors 72 and the like, in addition to a switch array 73 used as the setting means 41. Further, the control circuit board 31 is provided with OR gates 75, 76 so that a serial clock (SCLK) signal and a latch (LT) signal can be delivered from either the logic circuit 32 or a microcontroller 74 corresponding to the CPU 33. Also, the wires SCLK, LT, GND are connected to the parallel/serial converting IC 71 by means of the LED drivers 13, and the output from the parallel/serial converting IC 71 is delivered to the microcontroller 74 through the wire RD.

Next, the reading operation for the setting data will be explained with reference to the FIG. 7. When the setting in the switch array 73 is read, the microcontroller 74 sets a control (L-EN) signal (FIG. 7(a)) to a logic 1 so as to inhibit the operation, of logic circuit 32, and thereafter delivers a latch (LT) signal (FIG. 7(b)). This latch signal is delivered to the parallel/serial converting IC 71 through the OR gate 76, the wire LT, and the LED drivers 13. The parallel/serial converting IC 71 latches a parallel signal from the switch array 73 on its incorporated shift register when the latch signal is delivered. The microcontroller 74 delivers a certain number of serial clock (SCLK) pulses (FIG. 7(c)), corresponding to the number of switches in the switch array 73, after completion of the latching. These serial clock pulses are delivered to the parallel/serial converting IC 71 through the OR gate 75, the wire SCLK, and LED drivers 13. The parallel/serial converting IC 71 turns the setting data from the switch array 73, which has been latched in its incorporated shift register, into a serial signal (FIG. 7(d)) when it receives the serial clock signal, and delivers the same to the microcontroller 74 through the wire RD. After the data set on the switch array 73 has been read, the microcontroller inverts the control (L-EN) signal into a logic 0. As a result, the logic circuit 32 becomes operative and a serial data (SD) signal, the serial clock (SCLK) signal, and a latch (LT) signal and the strobe (STB) signal are fed to the wires SD, SCLK, LT, STB, respectively, so as to carry out normal printing. At this time, the signal delivered to the microcontroller 74 through the wire RD is treated as invalid data.

Thus, with this arrangement, setting data provided in parallel form by the switch array 73 is read as serial data, so that the number of conductors on the board 11 of the LED array printer head 1 can be smaller than in the first and second embodiments, in which the setting data are read as parallel signals. Furthermore, the number of pins for reading the setting data, in the connector 16 which is connected to the control circuit board 31, can be decreased (to only one, that is, the wire RD alone). Accordingly, the package space can be reduced further, and the cost can be reduced.

Figure 8:
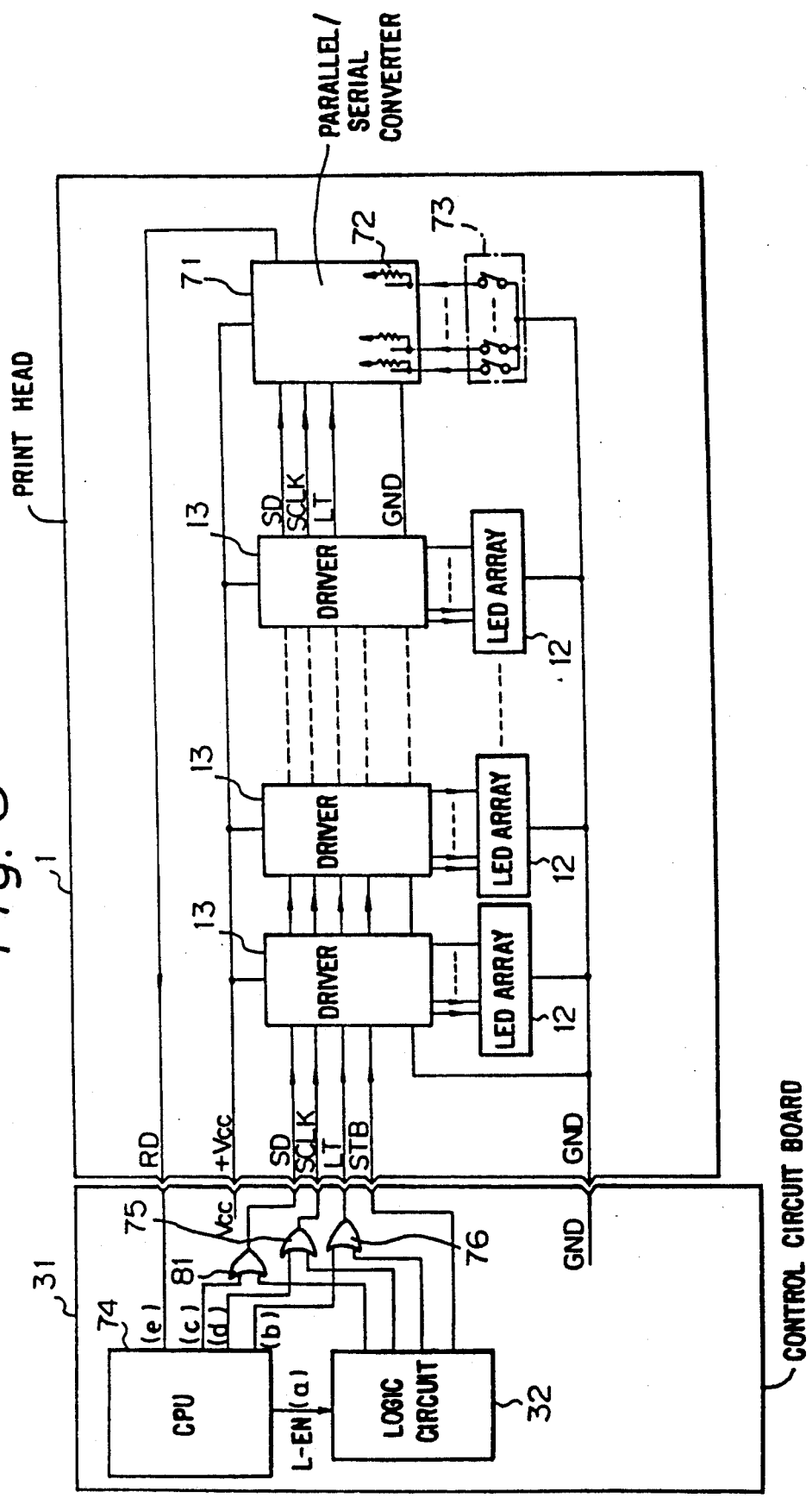
FIG. 8 is a block diagram showing a fourth specific embodiment of the present invention.

FIG. 8 shows a fourth specific embodiment of the present invention. In this embodiment, the wire SD is connected to the parallel/serial converting IC 71 by means of the LED drivers 13, and an OR gate 81 is also provided on the control circuit board 31 so that the serial data (SD) signal can be delivered from not only the logic circuit 32, but also the microcontroller 74 corresponding to the CPU 33. However, the other arrangements are similar to those in the third embodiment.

Next, the reading operation for the setting data will be explained with reference to FIG. 9.

The microcontroller 74 first emits the control (L-EN) signal (FIG. 9(a)) as a logic 1 so as to set the logic circuit 32 in a nonenergized condition, and thereafter, delivers the latch (LT) signal (FIG. 9(b)). The latching of the setting of the switch array on the shift register in the serial/parallel converting IC 71 is the same as that in the third embodiment.

Then, the microcontroller 74 delivers a two bit check serial data (SD) signal (FIG. 9(c)), and simultaneously delivers a number (m+n+2) of serial clock (SCLK) pulses (FIG. 9(d)). The value m, the value n, and the value 2 correspond respectively to the number of dots emitted by the LEDs 12, the number of setting bits (the number of switches on the switch array 73), and the number of the check serial data bits. The clock serial data (SD) signal is delivered to the parallel/serial converting IC 71 through the OR gate 81, the wire SD and the LED drivers 13, and the serial clock (SCLK) signal is delivered to the same through the OR gate 75, the wire SCLK, and the LED driver 13. As a result, the parallel/serial converting IC 71 delivers a predetermined data (RD) signal (FIG. 9(e)) to the microcontroller 74 through the wire RD in synchronization with the delivered serial clock signal. Since the number of the serial clock pulses is regulated as mentioned above, the setting data provided by the switch array 73 is read in synchronization with the number n of the serial clock pulses following the number m if the LED drivers are properly connected, and further, data which is read in synchronization with the last two serial clock pulses becomes the checking data. If the checking data is not read in synchronization with the last two serial clock pulses it can be said that an LED driver is not properly connected.

Thus, in the fourth embodiment, the setting data can be read by way of fewer wires, and simultaneously, whether the LED drivers 13 are properly connected can be tested.

FIG. 10 shows a fifth specific embodiment of the present invention. In this embodiment, not only parameters for compensating for variations in the LEDS, but also data relating to the basic specifications of the LED array print head 1, such as dot resolution, the number of data wires (a way of arrangement), and the like, are set by the switch array 73. As in the third specific embodiment, for example, the microcontroller 74 (corresponding to CPU 33) delivers a latch (LT) signal and a serial clock (SCLK) signal to the LED array print head 1 so as to read the setting data of the switch array 73. The thus read setting data concerning resolution, number of dots, a data wire number, and the like, are also delivered to the printer controller 38 through a bidirectional command interface 91. The printer controller 38 processes printing data corresponding to these data. Parameters such as the frequency (rate) of the serial clock (SCLK) signal, time intervals per wire (line cycle period), and the like, corresponding to the read resolution, dot number, data line numbers, and the like have been previously stored, as a table in memory 34. The microcontroller 74 sets the frequency of the serial clock (SCLK) signal and the number thereof per wire in accordance with the table after the setting data has been read from the switch array 73. This serial clock (SCLK) signal is fed to the printer controller 38 and the LED array print head 1. The printer controller 38 feeds printing data to the logic circuit 32 on the control circuit board 31 by way of a data bus 92 in synchronization with the serial clock (SCLK) signal delivered to the printer controller 38. The logic circuit 32 further delivers the thus received signal to the LED array print head 1 by way of a data bus 93. The wire number of the data buses 92, 93 is set to one or two corresponding to data on the switch array 73. If erroneous operation is likely to occur due to a high frequency for the serial clock signal is high, data is fed alternately to the lines in the buses so that the apparent clock frequency can be lowered. If the frequency is low, only one of the data lines is used.

The microcontroller 74 produces a pulse for every line cycle period, and delivers the same to the printer controller 38 by way of a line 94. The printer controller 38 delivers data per line to the logic circuit 32 in synchronization with the received pulse. Accordingly, the logic circuit 32 delivers the data to the LED array print head 1 in synchronization with the line cycle period. Further, the microcontroller 74 controls a sheet feed system (which is not shown) in synchronization with this line cycle period.

Table 2 exhibits examples of the specifications of the LED array print head 1. In this example, heads are roughly classified into A4 (letter) size heads and B4 size heads in view of the sizes of sheets to be printed. Five kinds of A4 size heads, are shown and three kinds of B4 size heads, are shown. Since the size is determined directly from the resolution and the number of dots per line, it is not necessary to particularly provide setting data indicating sizes. Four resolution values are shown—240, 300, 400 and 600 (dots/inch)—so the resolution is indicated by two bits. The number of dots is obtained by multiplying the number of dots per chip times the number of chips per row times the number of rows. If 64 dots are used as one unit, the number of dots is indicated by six bits. Since the number of the data lines is one (row) or two (rows), it is indicated by one bit. Accordingly, in this embodiment, nine switches are required in the switch array 73 in order to set these data.

If the sheet feed rate is set to 25.4 mm/sec and four sheets are printed every minute with the use of the heads shown in Table 2, the line frequencies and serial clock frequencies (transmission clock) are given in Table 3. By storing data as shown in Table 2 and Table 3 in the memory 34, a predetermined line frequency and a serial clock frequency can be automatically and directly determined in accordance with the nine bit setting data.

It is noted that, data concerning, for example, the wavelength of light emitted by the LEDS and light emission efficiency of the LEDs may also be set on the switch array 73.

In this embodiment, since LED printers having different specifications can be readily produced by merely selecting LED print heads in accordance with the different specifications, it is possible to reduce the cost. Further, a user can have access to several kinds of the printers by merely replacing heads, which is less expensive than purchasing several kinds of printers. Moreover, a print head having new specifications can be introduced merely by changing the software (firmware) in the memory 34, and accordingly, it is possible to shorten the time for research and development.

It is noted that the switch array 73 in the third, fourth and fifth specific embodiments can be replaced with short wires, bonding wires, or the like.

TABLE 2

| NO. | SHEET SIZE | RESO-LU-TION (dpi) | DOT NUMBER/LINE | WAY OF ARRANGE-MENT |
|---|---|---|---|---|
| 1 |  | 240 | C 2,048 = 64 × 32 × 1 | ONE ROW |
| 2 |  | 300 | C 2,560 = 64 × 40 × 1 | ONE ROW |
| 3 | LET-TER | 400 | C 3,450 = 64 × 54 × 1 | ONE ROW |
| 4 | (A4) | 400 | C 3,456 = 64 × 27 × 2 | TWO ROWS |
| 5 |  | 600 | C 5,240 = 64 × 40 × 2 | TWO ROWS |
| 6 |  | 240 | C 2,432 = 64 × 38 × 1 | ONE ROW |
| 7 | B4 | 300 | C 3,072 = 64 × 48 × 1 | ONE ROW |
| 8 |  | 400 | C 4,096 = 64 × 32 × 2 | TWO ROWS |

TABLE 3

| NO. | SHEET SIZE | RESO-LUTION (dpi) | LINE CYCLE PERIOD (msec) | TRANS-MISSION CLOCK (MHz) |
|---|---|---|---|---|
| 1 |  | 240 | 4.167 | 1 |
| 2 |  | 300 | 3.333 | 1 |
| 3 | LETTER | 400 | 2.5 | 2 |
| 4 | (A4) | 400 | 2.5 | 1 |
| 5 |  | 600 | 1.667 | 4 |
| 6 |  | 240 | 4.167 | 1 |
| 7 | B5 | 300 | 3.333 | 2 |
| 8 |  | 400 | 2.5 | 3 |

As mentioned above, the LED array printer according to the present invention has, in its LED array print head, a means for setting data indicating the specifications and characteristics of the head. Accordingly, it is possible to reliably set parameter information for print control, corresponding to specifications and characteristics of the head. This is useful for guaranteing both operation and guaranteing both printing quality of LED array printers in which several kinds of LED array print heads can be combined with a common printer control circuit.

Further, printers having different specifications can be readily obtained merely by replacement of print heads, so that printers having various different specifications can be readily produced and the specifications of a printer can be readily changed.

What we claim is:

1. An LED printer for use with a print controller which supplies printing data to the printer, comprising:
   an LED print head having a serial clock signal input port and a latch signal input port, the LED print head including
      a plurality of LED array chips, and
      a plurality of driver chips which are connected to the serial clock signal input port and the latch signal input port, each of said driver chips additionally being connected to a respective one of the LED array chips;
   a control circuit board which is separated from the LED print head, the control circuit board including
      a CPU having a serial clock signal output port and a latch signal output port,
      a logic circuit which receives the printing data from the print controller and which controls timing for supplying the printing data to the driver chips of the print head, the logic circuit being connected to the CPU and having a serial clock signal output port and a latch signal output port,
      a gate having an input port that is connected to the serial clock signal output port of the CPU, an input port that is connected to the serial clock signal output port of the logic circuit, and an output port that is connected to the serial clock signal input port of the print head, and another gate having an input port that is connected to the latch signal output port of the CPU, an input port that is connected to the latch signal output port of the logic circuit, and an output port that is connected to the latch signal input port of the print head; and data setting means for providing setting data in serial form to the CPU in accordance with characteristics and specifications of the LED print head, the data setting means being disposed on the LED print head and including means for establishing a setting data word in parallel form, and means for converting the setting data word from parallel form to serial form, the means for converting being connected to the serial clock signal input port and the latch signal input port of the print head.

2. The LED printer of claim 1, wherein the CPU additionally has a serial data output port, the logic circuit additionally has a serial data output port, the LED print head additionally has a serial data input port, and the control circuit board further comprises means for conveying serial data from either the serial data output port of the CPU or the serial data output port of the logic circuit to the driver chips and to the means for converting through the serial data input port of the LED print head.

3. The LED printer of claim 1, wherein the LED print head additionally includes a conductor that is maintained at a predetermined potential, the means for converting has a plurality of input ports, and the means for establishing comprises means for selectively connecting the conductor that is maintained at a predetermined potential to the input ports of the means for converting.

4. The LED printer of claim 3, wherein the means for selectively connecting comprises a plurality of switches.

5. The LED printer of claim 3, wherein the means for selectively connecting comprises a hard-wired conductor arrangement.

* * * * *